(12) United States Patent
Schuler et al.

(10) Patent No.: US 11,580,840 B2
(45) Date of Patent: Feb. 14, 2023

(54) DEVICE, PROCESS AND SYSTEM FOR ASSIGNING ALERTS TO SENSOR ANALYTICS ENGINES

(71) Applicant: MOTOROLA SOLUTIONS, INC., Chicago, IL (US)

(72) Inventors: Francesca Schuler, Chicago, IL (US); James C. Duran, Chicago, IL (US); Christine K. Rapala, Chicago, IL (US); Allen F. Bonney, Chicago, IL (US); Christopher E. Blackshear, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/133,709

(22) Filed: Dec. 24, 2020

(65) Prior Publication Data

US 2022/0207983 A1 Jun. 30, 2022

(51) Int. Cl.
| | | |
|---|---|---|
| *G08B 21/18* | (2006.01) | |
| *G08B 27/00* | (2006.01) | |
| *H04W 4/38* | (2018.01) | |
| *H04W 4/90* | (2018.01) | |
| *H04W 4/021* | (2018.01) | |

(52) U.S. Cl.
CPC .......... *G08B 21/18* (2013.01); *G08B 27/001* (2013.01); *G08B 27/005* (2013.01); *H04W 4/021* (2013.01); *H04W 4/38* (2018.02); *H04W 4/90* (2018.02)

(58) Field of Classification Search
CPC .... G08B 21/18; G08B 27/001; G08B 27/005; H04W 4/021; H04W 4/38; H04W 4/90; G06F 16/73; G06V 20/52
See application file for complete search history.

(56) References Cited

U.S. PATENT DOCUMENTS

| | | | |
|---|---|---|---|
| 9,386,050 | B2 | 7/2016 | Oswald |
| 9,389,083 | B1 | 7/2016 | Agulnik et al. |
| 9,852,606 | B1 | 12/2017 | Heier et al. |
| 2010/0231714 | A1 | 9/2010 | Flores et al. |
| 2014/0197948 | A1* | 7/2014 | Mo ........................ H04W 4/021 340/539.13 |
| 2019/0171740 | A1* | 6/2019 | Sabripour ........... G06F 16/2428 |
| 2019/0286901 | A1 | 9/2019 | Blanco et al. |

* cited by examiner

*Primary Examiner* — Brian Wilson
(74) *Attorney, Agent, or Firm* — Perry + Currier, Inc.

(57) ABSTRACT

A device, method and system for assigning alerts to sensor analytics engines is provided. A device one or more of generates and receives an alert to perform a search for a target object. The device determines a geographic area in which to perform the search for the target object. The device determines sensors available in the geographic area for use in the search for the target object. The device, in response to the sensors meeting a threshold condition, assigns the alert to a sensor analytics engine to search for the target object using the sensors. The device, in response to the sensors not meeting the threshold condition, provides the alert to one or more communication devices to initiate a human-based search for the target object.

20 Claims, 5 Drawing Sheets

DEVICE, PROCESS AND SYSTEM FOR ASSIGNING ALERTS TO SENSOR ANALYTICS ENGINES

BACKGROUND OF THE INVENTION

Alerts, such as public-safety alerts and the like, are used to initiate human-based searches for target objects, such as humans, vehicles, animals, etc. However, such alerts may result in heavy use of human-based resources as first responders, volunteers, etc. search for the target object.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
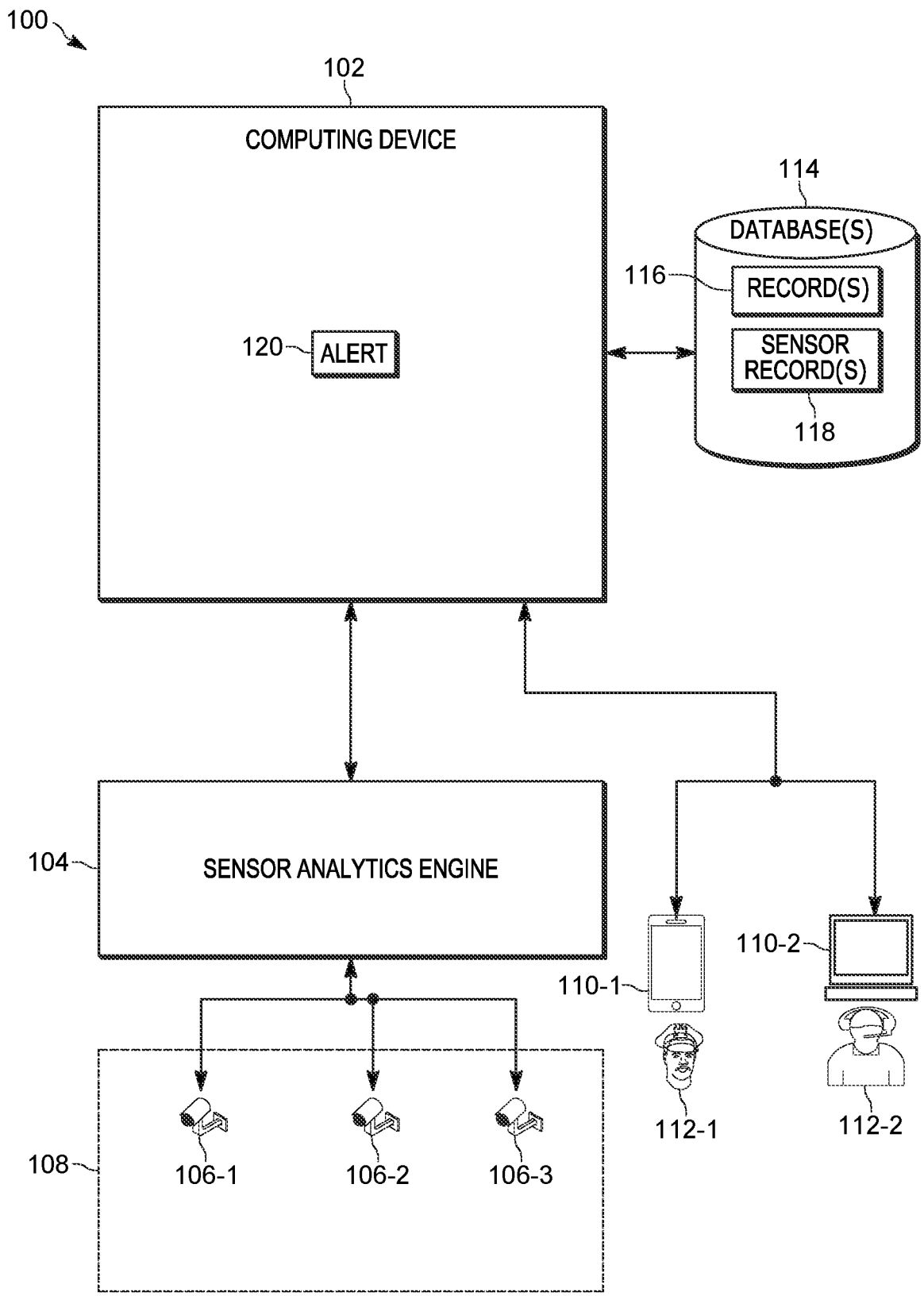
FIG. 1 is a system for assigning alerts to sensor analytics engines, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Alerts, such as public-safety alerts and the like, are used to initiate human-based searches for target objects, such as humans, vehicles, animals, etc. However, such alerts may result in heavy use of human-based resources as first responders, volunteers, etc. search for the target object. Furthermore, such human-based searches may only occur for a short period of time and thereafter stop and/or have reduced resources, leading to the alert growing stale. Furthermore, when some target objects are not found, alerts may be "retired" as the chances of the target object being found in a human-based search decrease over time, and hence, resources may be removed from searching. Furthermore, some target objects, such as dog, a bicycle, and the like, may not be of sufficient importance to initiate a human-based search; similarly, when a human-based search for such a target object is initiated, it may be in a context of providing first responders with many other similar alerts, and first responders, such as police officers on patrol, may find it challenging to search for many such target objects simultaneously. Hence, there exists a need for an improved technical method, device, and system for assigning alerts to sensor analytics engines.

In particular provided herein is a computing device, which may receive or generate an alert to perform a search for a target object; such an alert may include, but is not limited to, a one or more of a public-safety alert, a be-on-the-lookout (BOLO), an all-points bulletin (APB), a silver alert, a gold alert, an amber alert, and the like. The target object may comprise one or more of a person, an animal, a non-human object, and a vehicle. The computing device may determine a geographic area in which to perform the search for the target object, which may include, for example, a neighborhood where the target object went missing among other possibilities. The computing device is understood to have access to information indicating sensors available in the geographic area for use in the search for the target object, such as security cameras, and the like, which may be private and/or public security cameras, among other possibilities; some sensors may be portable cameras operated by first responders, and the like (e.g., vehicle cameras, body worn cameras, etc.). The computing device may determine whether, or not, the sensors meet a threshold condition, which may include, but is not limited to, a density and/or distribution of such sensors; the threshold condition may hence be related to a chance of success of a machine-based search for the target object. For example, when a density and/or distribution of the sensors is small and/or lower than a target density and/or a target distribution, the chances of success of a machine-based search for the target object may be very small; similarly, when a density and/or distribution of the sensor is high and/or greater than a target density and/or a target distribution, the chances of success of a machine-based search for the target object may be high. Hence, in response to the sensors meeting the threshold condition, the computing device may assign the alert to a sensor analytics engine to search for the target object using the sensors, as described hereafter. However, in response to the sensors not meeting the threshold condition, the computing device may provide the alert to one or more communication devices to initiate a human-based search for the target object.

In some examples, a decision to assign the alert to the sensor analytics engine or initiate the human-based search may further based on one or more criteria for minimizing one or more of human resources and cost in searching for the target object and maximizing a chance of success in finding the target object. Hence, the sensors meeting or not meeting the threshold condition may not be the only criteria for determining whether to assign the alert to the sensor analytics engine or initiate the human-based search.

Furthermore, when a human-based search is initiated, and is not successful, the alert may be assigned to the sensor analytics engine to search for the target object using the sensors.

An aspect of the present specification provides a method comprising: one or more of generating and receiving, at a computing device, an alert to perform a search for a target object; determining, at the computing device, a geographic area in which to perform the search for the target object; determining, at the computing device, sensors available in the geographic area for use in the search for the target object;

in response to the sensors meeting a threshold condition, assigning the alert to a sensor analytics engine to search for the target object using the sensors; and in response to the sensors not meeting the threshold condition, providing the alert to one or more communication devices to initiate a human-based search for the target object.

An aspect of the present specification provides a device comprising: a communication unit; and a controller communicatively coupled to the communication unit, the controller configured to: one or more of generate, and receive via the communication unit, an alert to perform a search for a target object; determine a geographic area in which to perform the search for the target object; determine sensors available in the geographic area for use in the search for the target object; in response to the sensors meeting a threshold condition, assign the alert to a sensor analytics engine to search for the target object using the sensors; and in response to the sensors not meeting the threshold condition, provide, via the communication unit, the alert to one or more communication devices to initiate a human-based search for the target object.

Each of the above-mentioned examples will be discussed in more detail below, starting with example system and device architectures of the system in which the embodiments may be practiced, followed by an illustration of processing blocks for achieving an improved technical method, device, and system for assigning alerts to sensor analytics engines based on context.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for assigning alerts to sensor analytics engines. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

Herein, reference will be made to engines, such as sensor analytics engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

The system 100 comprises a computing device 102, which is in communication with a sensor analytics engine 104, which is in communication with one or more sensors 106-1, 106-2, 106-3 (interchangeably referred to hereafter, collectively, as the sensors 106, and, generically and/or individually, as a sensors 106; this convention will be used elsewhere in the present specification) deployed in a geographic area 108. The computing device 102 is further in communication with one or more communication devices 110-1, 110-2 (e.g., the communication devices 110, and/or a device 110) operated by respective users 112-1, 112-2 (e.g., the users 112, and/or a user 112).

While three sensors 106 are depicted, the system 100 may comprise as few as one sensor 106, or more than two sensors 106. Similarly, two communication devices 110 are depicted, the system 100 may comprise as few as one communication device 110 (e.g., and one associated user 112), or more than two communication devices 110 (e.g., and one users 112).

As depicted, the computing device 102 may have access to at least one memory 114, depicted in the form of a database (though the at least one memory 114 may be in any suitable format), storing records 116 and sensor records 118. The memory 114 may be external to the computing device 102 and/or the at least one memory 114 (and/or a portion thereof) may be a component of the computing device 102 and/or one or more of the records 116, 118 may be stored at a memory of the computing device 102. Furthermore, the memory 114 may comprise a plurality of memories and/or databases, which may be operated by a same entity operating the computing device 102, and/or one or more different entities, which may include, but is not limited to as a justice department and the like.

The computing device 102 may comprise one or more servers and/or one or more cloud computing devices, and may include, but is not limited to, a computer-aided dispatch (CAD) computing device, and the like, though the computing device 102 may be operated by any suitable entity including, but not limited to, a public safety entity, such as a police force and the like, and/or a business, such as a security company and the like, and/or any other suitable entity.

Functionality of the computing device 102 is described in more detail below and with respect to FIG. 2 and FIG. 3, however it is understood that the computing device 102 is generally configured to receive and/or generate alerts including, but not limited to, one or more of a public-safety alert, a BOLO, an APB, a silver alert, a gold alert, an amber alert, and the like. An exemplary alert 120 is depicted at the computing device 102. For example, the alert 120 may be to search for a target object including, but not limited to, one or more of a person, an animal, a non-human object, a vehicle, and the like. The alert 120 may be received at the computing device 102 from another device of the system (e.g., the communication device 110-2), and/or the alert 120 may be generated by the computing device 102 based on the records 116, described in more detail below.

Regardless, the alert 120 may be understood to comprise an electronic indication of a target object for which a search is to be performed. For example, the alert 120 may be in a format suitable for a human-based search performed, for example, by one or more of the users 112, and hence may include, but is not limited to, a textual description of the target object and/or an image of the target object, and the like. Alternatively, and/or in addition, the alert 120 may be in a format suitable for a search by the sensor analytics engine 104, and hence may include, but is not limited to, classifiers and/or machine learning classifiers representing a target object. Furthermore, the computing device 102 may be configured to format and/or transform the alert 120 accordingly, depending on whether a decision is made to assign the alert 120 to the sensor analytics engine 104 to search for the target object via the sensors 106, or initiate a human-based search by providing the alert 120 to the communication devices 110.

The sensor analytics engine 104 comprises any suitable combination of hardware and software, which may receive sensor data from the sensors 106 and search for a target object in the sensor data using, for example, data received with alerts, such as the alert 120, including, but not limited to, the aforementioned classifiers and/or machine learning classifiers representing a target object. For example, sensor data from the sensors 106 may comprise any suitable combination of video data and audio data and hence the sensor analytics engine 104 may comprise one or more of a video analytics engine and an audio analytics engine; a video analytics engine may search images and/or video from the sensors 106 for target objects, and similarly, an audio analytics engine may search audio (e.g., which may be incorporated into video) from the sensors 106 for target objects. However, any suitable sensor data may be received at the sensor analytics engine 104, from the sensors 106, including, but not limited to, sensed chemical data, and the like, and the sensor analytics engine 104 may be configured to search the sensor data for the target object, as received in any suitable format.

Hence, the sensor analytics engine 104 is understood to include any suitable combination of algorithms, and/or machine learning algorithms, and the like, that may be implemented by hardware to search sensor data for target objects.

While depicted as a stand-alone components, the sensor analytics engine 104 may be hosted by the computing device 102 and/or the sensor analytics engine 104 may be hosted at one or more cloud-computing devices, which may be the same as, or different, from the computing device 102, and/or the sensor analytics engine 104 may be hosted by hardware at one or more of the sensors 106 and/or the sensor analytics engine 104 may reside at one or more appliances located at one or more of the sensors 106. Similarly, while only one sensor analytics engine 104 is depicted, the system 100 may comprise more than one sensor analytics engine 104 (e.g., a sensor analytics engine 104 per sensor 106).

As depicted, the sensors 106 comprise cameras, and the like, which may acquire images and/or video, with, or without, audio, and the like. However, the sensors 106 may comprise microphones, and the like, which acquire audio without images. However, the sensors 106 may comprise chemical sensors and the like, and/or any other suitable type of sensors configured to electronically sense one or more of an object, condition, environment, person, and/or other attribute in a field of view and/or range of sensing thereof.

As depicted, the sensors 106 are understood to be in the geographic area 108, and for example may comprise fixed sensors mounted to poles and/or buildings, and the like, in the geographic area 108. The sensors 106 may comprise public-safety related sensors (e.g., closed-circuit cameras, and/or other types of sensors), installed and/or operated by a civic and/or public-safety entity, such as a municipality, a police force and the like. However, sensors 106 may comprise private sensors (e.g., closed-circuit cameras, and/or other types of sensors) installed and/or operated, for example, by private security companies, building owners, private citizens and the like.

Alternatively, one or more of the sensors 106 may comprise mobile sensors, such as vehicle cameras and/or body worn cameras operated by first responders, and the like (e.g., security guards), who may be patrolling the geographic area 108.

Regardless, information regarding the sensors 106 may be registered with an entity operating the computing device 102, which may store the information in the sensor records 118.

Hence, the sensor records 118 may store indications of types of the sensors 106 and/or locations of the sensors 106 in the geographic area 108, among other possibilities. Hence, for example the sensor records 118 may indicate a density of the sensors 106 in the geographic area 108, a distribution of the sensors 106 in the geographic area 108 (e.g., on main streets and/or side streets, on private premises, on business premises, and the like), a type of scene (e.g., a scene type) being imaged by the sensors 106 (e.g., a private premises, a business premises, a parking lot, and the like, assuming, for example assuming that that the sensors 106 comprise cameras), among other possibilities. In general, the sensor records 118 may assist the computing device 102 with determining whether the sensors 106 meet a threshold condition.

The sensor records 118 may be provisioned at the memory 114, and the like, when the sensors 106 are installed. Alternatively, when the sensors 106 comprise mobile sensors, the sensor records 118 may comprise CAD records, which are periodically updated to indicate positions of the mobile sensors based on location data reported by the mobile sensors (and/or other devices with the mobile sensors) for example to the computing device 102, which may update the CAD records (e.g., sensor records 118) accordingly. Hence, while the sensors 106 are depicted as being in communication with the computing device 102 via the sensor analytics engine 104, the sensors 106 may also be in more direct communication with the computing device 102.

While sensors 106 in only one geographic area 108 are depicted, it is understood that the system 100 may comprise other sensors 106 in other geographic areas 108.

The geographic area 108 may be any suitable geographic area and may be one of a plurality of geographic areas into which a larger geographic region may be divided, for example by neighborhood, district, precinct (e.g., police precinct), ward, county, and the like.

The communication devices 110 may comprise any suitable devices that may be used to receive alerts, such as the alert 120, to initiate a human-based search for a target object using information received in an alert, including, but limited to, the aforementioned textual description and/or image of a target object. As depicted, the communication device 110-1 comprises a mobile device operated by a user 112-1 who is a first responder, such as a police officer, and the like. In some examples, the user 112-1 may comprise a first responder present in the geographic area 108, and/or assigned to patrol and/or search for target objects in the geographic area 108 (e.g., whether initially physically located in the geographic area 108 or, as depicted, not initially physically located in the geographic area 108); indeed, in some examples, the communication device 110-1 may also comprise a sensor 106, and may be "counted" as such by the computing device 102 at least when located in the geographic area 108.

As depicted, the communication device 110 comprises a dispatch terminal and/or a computer workstation, and the like, operated by a user 112-2 who may be a dispatcher and the like, and/or who may assign alerts, such as the alert 120, in general to suitable components of the system 100 for processing thereby and/or specifically to other users, such as the user 112-1, to perform a human-based search for a target object. For example, the user 112-2 may alternatively be a supervisor, and the like, of the user 112-1. However, the user 112-2 may alternatively be an analyst who may have access to sensor data from the sensors 106 and/or any other suitable data, who may request a search and/or may perform a human-based search for a target object.

While the communication devices 110 and the users 112 are depicted as specific types of communication devices 110 and users 112, the communication devices 110 and the users 112 may comprise any suitable types of communication devices and the users. For example, supervisor may operate a mobile device rather than a workstation, and/or a user 112 may be a volunteer, and/or a private citizen and/or an employee of an entity who may perform human-based searches for target objects, and the like.

The records 116 may comprise any suitable records stored in any number of suitable memories and/or databases that may be used to generate alerts, such as the alert 120. For example, records 116 may comprise any suitable combination of one or more of historical records, public-safety records, Criminal Justice Information Services (CJIS) record, computer-aided dispatch (CAD) records, legal records, records of retired alerts, among other possibilities.

For example, public-safety records, CAD records may comprise records of past and/or current and/or on-going public-safety incidents, and the like, from which target objects, for which a search may be performed, may be identified. Such public-safety records, CAD records may comprise police records, incident records, dispatch records, and the like. For example, such public-safety records, CAD records may be used to identify missing persons, missing vehicles, missing bicycles, missing pets, and the like.

Similarly, CJIS records and/or legal records, and the like, may comprise court records, probation records, public attorney records, and the like, from which target objects, for which a search may be performed, may be identified. For example, CJIS records and/or legal records may be used to identify missing persons, missing vehicles, missing bicycles, missing pets, and the like.

In some examples, the records 116 may include records of retired alerts such as previously generated alerts for which a human-based search for a target object was unsuccessful, but which may be revived by the computing device 102.

Hence, the records 116 may be used by the computing device 102 to generate any suitable alert, such as the alert 120, and furthermore, information to populate such alerts may be retrieved from the records 116 including, but not limited to, textual descriptions of the target objects, images thereof, and the like. Such information may be used by the computing device 102 to generate classifiers, and the like, usable by the sensor analytics engine 104 to search for a target object in the sensor data from the sensors 106, which may be incorporated into the alerts, such as the alert 120, for example to perform image and/or audio searches in images and/or audio acquired by cameras of the sensors 106. In instances where the sensors 106 comprise chemical sensors, and the like, and a target object comprises a vehicle, and the like, information of the alert 120, usable by the sensor analytics engine 104 to search for the vehicle in the sensor data from the chemical sensors 106 may indicate whether the vehicle is emitting diesel fumes, and/or other types of fumes and/or chemicals, that may be detected by the chemical sensors 106.

In some examples, the records 116 may comprise historical records of past searches carried out in the geographic area 108 (and other geographic areas) in response to past alerts, either by the sensor analytics engine 104 and/or via a human-based search, and may indicate whether, or not, such searches were successful. Such historical records may also be used to determine whether, or not, the sensors 106 meet a threshold condition, as described below.

In general, the computing device 102 determines whether to assign an alert, such as the alert 120, to the sensor analytics engine 104, to search for a target object using the sensors 106, or whether to provide an alert, such as the alert 120, to one or more of the communication devices 110 to initiate a human-based search for the target object, for example by one or more of the users 112 (or both, in some examples). It is understood that any search for a target object is to occur in a given geographic region, such as the geographic area 108, which may be identified in a received alert and/or identified from the records 116. For example, the records 116 may indicate that a target object was last seen in the geographic area 108 (and/or another geographic region) and hereafter it will be assumed that the alert 120 is to perform a search for a target object in the geographic area 108.

Hence, in these examples, the computing device 102 determines whether to assign the alert 120 to the sensor analytics engine 104, or to provide the alert 120 the one or more of the communication devices 110 based on whether, or not the sensors 106 meet a threshold condition, which is generally indicative how successful a sensor-based search for the target object might be.

For example, a threshold condition may indicate a minimum sensor density in the geographic area 108 above, which a sensor-based search for the target object may be successful.

In another example, the threshold condition may indicate a minimum number and/or density of sensors 106, in the geographic area 108, associated with given locations and/or scene types, above which a sensor-based search for the target object may be successful, for example a minimum number of sensors 106 having street locations and/or main street locations and/or associated with street views and/or main street views, and the like.

Alternatively, the threshold condition may be more descriptive, such as given locations and/or scene types associated with the sensors 106 that may lead to a sensor-based search for the target object being successful.

Such threshold conditions may be determined heuristically and/or may be determined using the historical records (of the records 116) indicating whether past sensor-based searches and/or human-based searches were successful in the geographic area 108, for example for a given target object type indicated by the alert 120. In a particular example, the historical records may indicate that sensor-based searches for vehicles in the geographic area 108 were successful, but sensor-based searches for humans in the geographic area 108 were not successful, for example due to sensor density, and the like. Hence, the sensors 106 may be determined to meet, or not meet, a threshold condition based on the historical records and/or for a given target object type in the alert 120.

Indeed, the threshold condition may be more generally based on a type of the target object in the alert 120. For example, one threshold condition may be available for humans, while another threshold condition may be available for vehicles. In particular, the computing device 102 may be configured to determine a type of the target object in the alert 120 and select an associated threshold condition.

In a particular example, the alert 120 may be for a vehicle, and the sensors 106 may have a density in the geographic area 108, such as two sensors 106 per city block mile, that is above a threshold density for searching for vehicles, and the like, and/or the sensors 106 may have a distribution in the geographic area 108, such as locations that largely monitor general street views, and the like, which may meet an associated distribution threshold condition for searching for vehicles. In these instances, the computing device 102 may assign the alert 120 to the sensor analytics engine 104 to search for the vehicle using the sensors 106.

However, the alert 120 may be for a human, and the density and/or distribution of the sensors 106 in the geographic area 108 may be below, and/or may not meet, a threshold condition for searching for humans. In these instances, based on a same density and/or distribution of the sensors 106, and the like, the computing device 102 may provide the alert 120 the one or more of the communication devices 110 to initiate a human-based search for the human (which, in various examples, may be provided only to the one or more of the communication devices 110 or the alert 120 may be provided to the one or more of the communication devices 110 in addition to the sensor analytics engine 104).

However, in other examples where the alert 120 may be for a vehicle, the sensors 106 may have a density in the geographic area 108, such as one sensor 106 per square mile, and the like, that is below a threshold density for searching for vehicles, and/or the sensors 106 may have a distribution in the geographic area 108, such as locations that largely monitor doors of businesses and not general street views, and the like, which may not meet an associated distribution threshold condition for searching for vehicles. In these instances, the computing device 102 may provide the alert 120 the one or more of the communication devices 110 to initiate a human-based search for the vehicle (which, in various examples, may be provided only to the one or more of the communication devices 110 or the alert 120 may be provided to the one or more of the communication devices 110 in addition to the sensor analytics engine 104).

However, when the alert 120 is for a human, this same density and/or same distribution of the sensors 106 in the geographic area 108 may meet a threshold condition for searching for humans. For example, the sensors 106 largely monitoring doors of businesses and not general street views, and the like, may be better for searching for humans than vehicles. In these instances, based on a same density and/or distribution of the sensors 106, the computing device 102 may assign the alert 120 to the sensor analytics engine 104 to search for the human using the sensors 106, for example based on locations of the sensors 106 and/or types of scenes imaged by cameras of the sensors 106 (e.g. and the alert 120 may not, in these examples, be provided to the communication devices 110).

However any suitable threshold conditions are within the scope of the present specification, which may include, but is not limited to, threshold conditions based on types of sensors 106 in the geographic area 108, such as a minimum density and/or minimum number of sensors 106 of a given type, such as a minimum density and/or minimum number of cameras and the like, in the geographic area 108. Hence, a given density of chemical sensors 106 the geographic area 108, may not meet a threshold conditions based on a minimum density and/or minimum number of cameras.

It is hence, further understood that threshold conditions related to density and/or distribution are indicative of coverage of the sensors 106 of the geographic area 108 (e.g., a portion of the geographic area 108 that is sensed and/or imaged, and the like, by the sensors 106). Hence, threshold conditions that relative to coverage are within the scope of the present specification and, which may include combinations of the threshold conditions associated with density and/or distribution of the sensors 106, among other possibilities. In a particular example, where the sensors 106 comprise camera, a threshold condition may comprise the cameras of the sensors 106 imaging a threshold percentage, and the like, of the geographic area 106, among other possibilities; coverage of an individual camera of the sensors 106 may be indicated in the sensor records 118 (e.g., the sensor records 118 may store a size of an area imaged by an individual camera of the sensors 106).

However, the computing device 102 may further base decisions to assign the alert 120 to the sensor analytics engine 104, or initiating the human-based search, on one or more criteria for minimizing one or more of human resources and cost in searching for the target object and maximizing a chance of success in finding the target object. Such criteria will be described in more detail below but may also be used to target a human-based search to the geographic area 108 only, or to a wider geographic region. Furthermore, some alerts, for example a newly created amber alert, and the like, may automatically cause a human-based search to be initiated.

Figure 2:
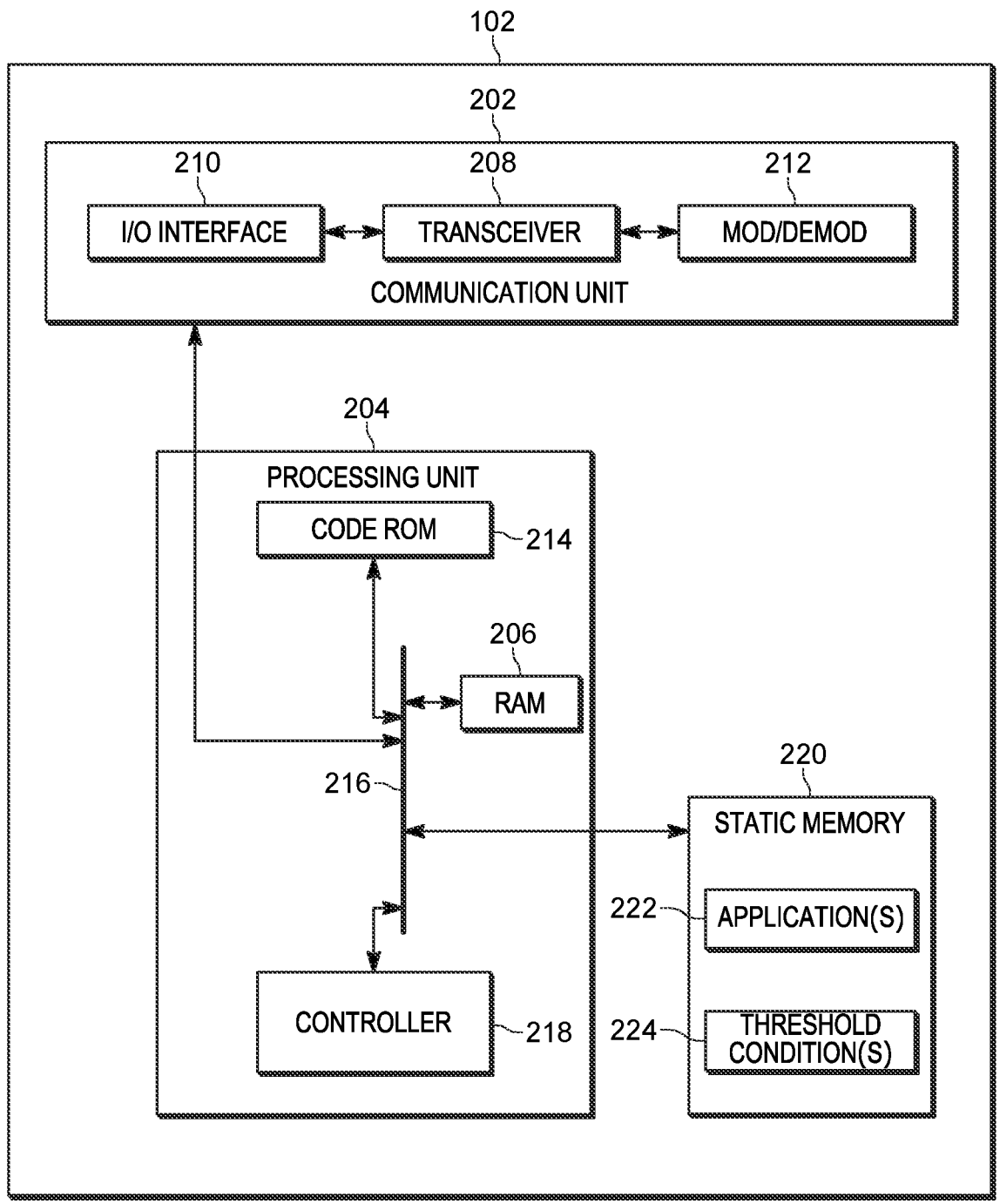
FIG. 2 is a device diagram showing a device structure of a device for assigning alerts to sensor analytics engines, in accordance with some examples.

Attention is next directed to FIG. 2, which depicts a schematic block diagram of an example of the computing device 102. In general, the computing device 102 may comprise one or more servers and/or one or more cloud computing devices in communication with the sensor analytics engine 104 and the communication devices 110. The computing device 102 may further be in communication with the memory 114, which may be local or remote from the computing device 102, and in communication therewith via any suitable combination of wired and/or wireless communication links and/or the computing device 102 may comprise the memory 114 and/or the records 116, 118 and/or a portion of the records 116, 118.

As depicted, the computing device 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include one or more of an input device and a display screen and the like.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3$^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for assigning alerts to sensor analytics engines. For example, in some examples, the computing device 102 and/or the controller 218 specifically comprises a computer executable engine configured to implement functionality for assigning alerts to sensor analytics engines.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the computing device 102 as described herein are maintained, persistently, at the memory 220 and used by the controller 218, which makes appropriate utilization of volatile storage during the execution of such programming instructions.

Figure 3:
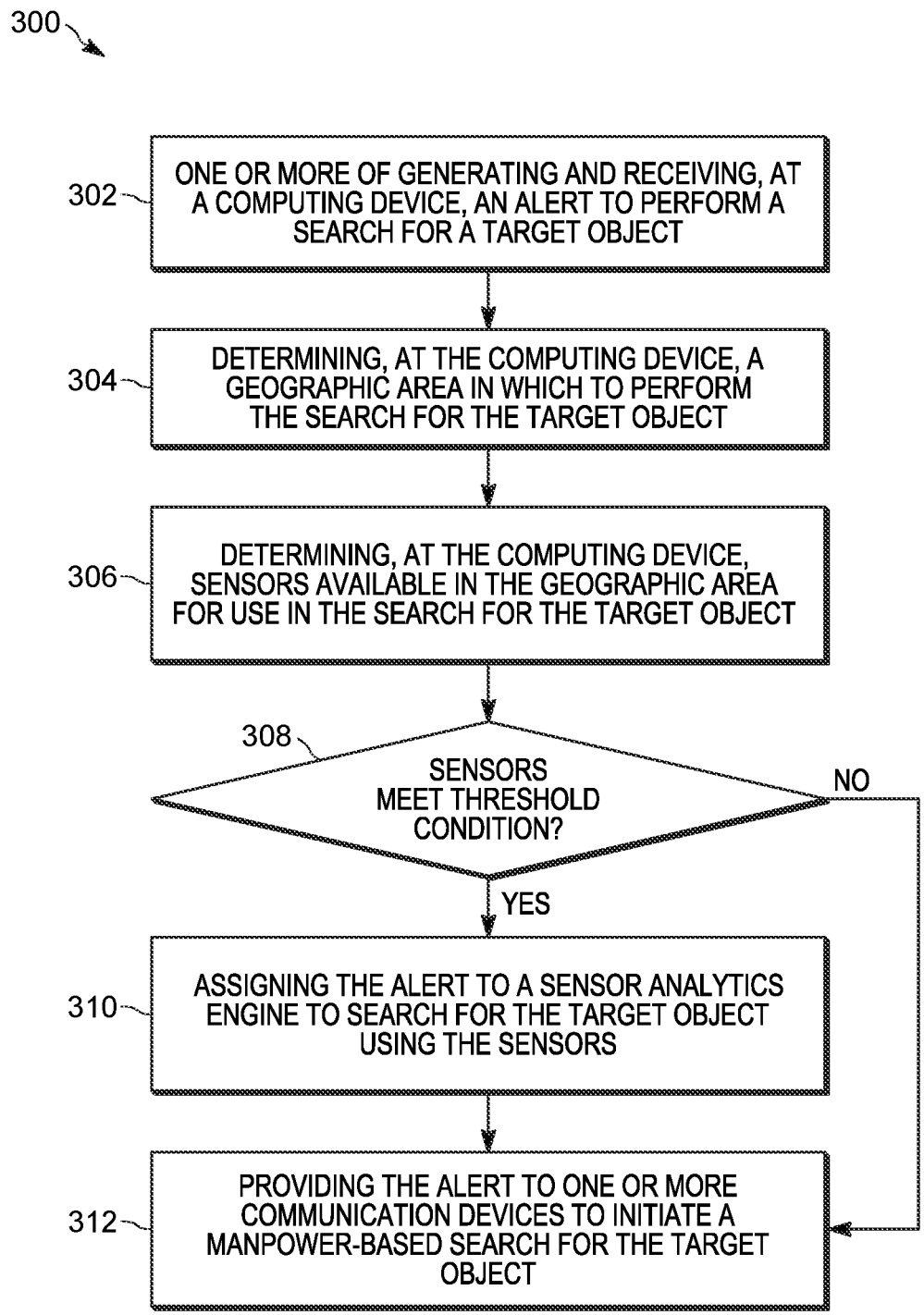
FIG. 3 is a flowchart of a process for assigning alerts to sensor analytics engines, in accordance with some examples.

In particular, the memory 220 stores instructions corresponding to the at least one application 222 that, when executed by the controller 218, enables the controller 218 to implement functionality for assigning alerts to sensor analytics engines, including but not limited to, the blocks of the process set forth in FIG. 3.

Furthermore, as depicted, the memory 220 stores one or more threshold conditions 224, which may be used to determine whether to assign an alert to the sensor analytics engine 104 to search for a target object using the sensors 106, or to provide the alert to the communication devices 110 to initiate a human-based search for the target object. Alternatively, and/or in addition, the one or more threshold conditions 224 may be incorporated into the application 22.

In illustrated examples, when the controller 218 executes the one or more applications 222, the controller 218 is enabled to: one or more of generate and receive an alert to perform a search for a target object; determine a geographic area in which to perform the search for the target object; determine sensors available in the geographic area for use in the search for the target object; in response to the sensors meeting a threshold condition, assign the alert to a sensor analytics engine to search for the target object using the sensors; and in response to the sensors not meeting the threshold condition, provide the alert to one or more communication devices to initiate a human-based search for the target object.

The application 222 may include programmatic algorithms, and the like, to implement functionality as described herein, which may include, but is not limited to, one or more programmatic algorithms.

Alternatively, and/or in addition to programmatic algorithms, the application 222 may include one or more machine learning algorithms to implement functionality as described herein, and which may include, but is not limited to, a machine learning algorithm. The one or more machine learning models and/or algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. Any suitable machine learning algorithm and/or deep learning algorithm and/or neural network is within the scope of present examples.

In examples where the application 222 includes one or more machine learning algorithms, the computing device 102 may be operated in a learning mode to "teach" the one or more machine learning algorithms to determine whether or not sensors meet a threshold condition 224. For example, in such a learning mode, historical records (e.g., of the records 116) may be provided to indicate decisions as to whether or not sensors indicated in sensor records (e.g., such as the sensor records 118) meet a threshold condition 224. Such historical records may further indicate decisions as to whether or not given alerts were assigned to the sensor analytical engine 104 or provided to the one or more communication devices 110, for example to indicate whether or not a given alert met criteria for minimizing one or more of human resources and cost in searching for a target object in a given alert, and maximizing a chance of success in finding the target object. Such decisions may also be provided in such a learning mode by manual operators and/or artificial intelligence based devices. Regardless, the computing device 102 may be "taught" to assign an alert to the sensor analytics engine 104 to search for a target object using the sensors 106, or to provide the alert to the communication devices 110 to initiate a human-based search for the target object based on historical records and/or manual feedback.

While the components of the sensor analytical engine 104 and the communication devices 110, are not depicted, it is understood that components of such devices may be similar to the components of the computing device 102, but adapted for respective functionality thereof as described herein. In particular, the sensor analytical engine 104 is understood to be enabled to receive alerts and search for associated target objects in sensor data from the sensors 106; hence, the sensor analytical engine 104 may include, but is not limited to a GPU for processing images to search for the target objects in images from cameras of the sensor 106. Such searches may be carried out by the sensor analytical engine 104 using numerical algorithms and/or machine learning algorithms.

Similarly, the communication devices 110 are understood to be enabled to receive alerts and furthermore include display screens and/or other notification devices, configured to provide an indication of an alert (e.g., such as images in the alerts and/or descriptive text, which may be converted to audio and played at a speaker notification device of the communication devices 110).

Attention is now directed to FIG. 3, which depicts a flowchart representative of a process 300 for assigning alerts to sensor analytics engines. The operations of the process 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The process 300 of FIG. 3 is one way in which the controller 218 and/or the computing device 102 and/or the system 100 may be configured. Furthermore, the following discussion of the process 300 of FIG. 3 will lead to a further understanding of the system 100, and its various components.

The process 300 of FIG. 3 need not be performed in the exact sequence as shown and likewise various blocks may be performed in parallel rather than in sequence. Accordingly, as previously mentioned, the elements of process 300 are referred to herein as "blocks" rather than "steps." The process 300 of FIG. 3 may be implemented on variations of the system 100 of FIG. 1, as well.

At a block 302, the controller 218 and/or the computing device 102, one or more of generates and receives the alert 120 to perform a search for a target object.

For example, the controller 218 and/or the computing device 102 may receive the alert 120 from an external communication device, such as one or more of the communication devices 110 or another communication device, such as a communication device associated with another entity (e.g., a neighboring police force issuing an APB or a BOLO, and the like).

Alternatively, the controller 218 and/or the computing device 102 may periodically retrieve and/or process the records 116 to search for target objects for which an alert may be generated. For example, such target objects may be target objects, such as bicycles, pets, and the like, and/or suspects of minor criminal offences such as shop-lifting, breaching probation orders, and the like, and/or any target object for which an alert, such as APB or a BOLO, and the like, may not normally be issued. In particular, the controller 218 and/or the computing device 102 may search the records 116 (e.g., incident records, court records, probation records and the like) for such a target object and generate an alert 120 accordingly.

At a block 304, the controller 218 and/or the computing device 102 determines a geographic area in which to perform the search for the target object. In examples where the alert 120 is received, the alert 120 may indicate the geographic area 108 as being a last known location of the target object of the alert 120. In examples where controller 218 and/or the computing device 102 generate the alert 120, the records 116 from which the alert 120 was generated may indicate a last known location of the target object and/or a known address of the target object. In particular examples, when a record 116 indicates a target object for which the alert 120 is generated, the record 116 may not indicate a last known location of the target object and/or a known address of the target object, however, such a record 116 may include a link, or links (e.g., electronic links and/or browser-type links, such as Uniform Resource Locators (URLs) and the like) to other records (e.g., Department of Motor Vehicles (DMV) records), which include a known address of the target object, and the like. Hence, the controller 218 and/or the computing device 102 may be configured to determine the geographic area in which to perform the search for the target object based on one or more of records 116 associated with the target object and links to the target object, among other possibilities.

Hereafter, it is assumed that the geographic area 108 has been determined as the geographic area in which to perform the search for the target object.

At a block 306, the controller 218 and/or the computing device 102 determines the sensors 106 available in the geographic area 108 for use in the search for the target object, for example by processing the sensor records 118 to determine which sensors 106 are located in the geographic area, a density and/or number and/or locations and/or types of the sensors 106 in the geographic area 108, as previously described.

At a block 308, the controller 218 and/or the computing device 102 determines whether or not the sensors 106 meet a threshold condition 224.

As has previously been described, a threshold condition 224 may be based on one or more of a density of the sensors 106 in the geographic area 108, numbers of the sensors 106 in the geographic area 108, locations of the sensors 106 in the geographic area 108, types of scenes (e.g., scene types) imaged by cameras of the sensors 106 in the geographic area 108, types of the sensors 106 available in the geographic area 108, and the like.

Furthermore, the controller 218 and/or the computing device 102 may compare the sensors 106 to more than one threshold condition 224 and use any suitable weighted scoring scheme and an associated weighted threshold condition 224 to determine whether, or not, the sensors 106 meet the threshold conditions 224. For example, the controller 218 and/or the computing device 102 may compare the sensors 106 (e.g., information about the sensors 106 indicated in the sensor records 118) to a plurality of threshold conditions 224 and assign a score to each comparison, with each score being weighted. In some examples, such a weighting scheme may depend on a type of a target object of the alert 120.

For example, a target object of the alert 120 comprising a vehicle, the sensors 106 may meet a first threshold condition of cameras thereof being above a threshold density associated with detecting vehicles (e.g., a given number of cameras per city block), but the sensors 106 may not meet a second threshold condition of a number of cameras of the sensors 106 being at given locations and/or imaging given scene types, such as being located on main streets and/or imaging scenes of streets. In these examples, the sensors 106 meeting the first threshold condition may be given a score of "1" but may be weighted to "30%" and/or "0.3", while the sensors 106 not meeting the second threshold condition may be given a score of "0" and may be weighted to "70%" and/or "0.7", giving an overall score of 30% or 0.3 (e.g., (1*0.3)+(0*0.7)). A weighted threshold condition may comprise the sensors 106 having a total weighted score of at least 60% or 0.6 to assign the alert 120 to the sensor analytics engine 104. Hence, in this example, the sensors 106 would not meet a weighted threshold condition. However, other scoring schemes and/or weighting schemes are within the scope of the present specification.

Furthermore, such a weighted scoring scheme may depend on other threshold conditions 224 including, but not limited to, a threshold number and/or density of fixed sensors 106 in the geographic area 108, a threshold number and/or density of mobile sensors 106 in the geographic area 108, a threshold number and/or density of mobile sensors 106 that comprise vehicle cameras in the geographic area 108, a threshold number and/or density of mobile sensors 106 that comprise body worn cameras in the geographic area 108, and the like. Furthermore, weighting of these various threshold conditions 224 may depend on whether the target object is a person or a vehicle.

For example, the sensors 106 meeting a threshold condition 224 of a threshold number of vehicle cameras in the geographic area 108 may be weighted higher for target objects that are vehicles but lower for target objects that are people. Similarly, the sensors 106 meeting a threshold condition 224 of a threshold number of body worn cameras in the geographic area 108 may be weighted lower for target objects that are vehicles but higher for target objects that are people. While the terms "higher" and "lower" are used to describe such weighting, it is understood that exact numbers may be used to perform such weighting; for example, the application 222 may include various weighting schemes for scoring and/or weighting the sensors 106 meeting or not meeting a threshold condition 224, and weights thereof, depending on the type of target object as has been previously described Furthermore, other threshold conditions 224 may be based on historical records. In a particular example, when the target object of the alert 120 is a vehicle, a threshold condition 224 comprise with whether, or not, the sensors 106 were previously successfully used to find vehicles in the geographic area 108.

However, the controller 218 and/or the computing device 102 may rely on machine learning algorithms, and the like, rather than numerical weighting schemes, to determine whether the sensors 106 meet a threshold condition 224 and/or such numerical weighting schemes may be implemented via machine learning algorithms.

In response to the sensors 106 meeting a threshold condition (e.g., a "YES" decision at the block 308), at a block 310, the controller 218 and/or the computing device 102 assigns the alert 120 to the sensor analytics engine 104 to search for the target object using the sensors 106. For example, the controller 218 and/or the computing device 102 may transmit and/or provide the alert 120 to the sensor analytics engine 104.

In particular examples, the controller 218 and/or the computing device 102 may generate at least one classifier for use by the sensor analytics engine 104 to search for the target object using one or more algorithms, at the sensor analytics engine 104, to search for the target object using sensor data from the sensors 106 as input to the one or more algorithms. Such a classifier may be incorporated into the alert 120, which is provided to and/or transmitted to the sensor analytics engine 104 for use in such searching. Such a classifier may comprise a machine learning classifier representing the target object, which is used as input to one or more machine learning algorithms at the sensor analytics engine 104 to search for the target object in sensor data from the sensors 106.

In a particular example, the sensor analytics engine 104 may receive images and/or video from cameras of the sensors 106 and perform an image search for the target object in the images and/or video; hence the classifier, and the like, provided with the alert 120 may represent an image of the target object. Similarly, the sensor analytics engine 104 may receive audio from microphones of the sensors 106 and perform an audio search for the target object in the audio from the sensors 106; hence the classifier, and the like, provided with the alert 120 may represent audio of the target object (e.g., a voice of a human of the target object, or a sound of a vehicle of the target object, and the like). Similarly, the sensor analytics engine 104 may receive chemical data from chemical sensors 106 and perform a search for a particular chemical for the target object in the chemical data, and the classifier, and the like, provided with the alert 120 may represent the particular chemical associated with the target object (e.g., diesel fumes, and the like).

When the sensor analytics engine 104 finds the target object in the sensor data from the sensors 106, the sensor analytics engine 104 may generate a notification thereof, which may include a respective location of a sensor 106 that provided the sensor data where the target object was found and/or an image and/or audio, and the like, of the target object in the sensor data (when available). The notification may be provided to the computing device 102 and distributed to the communication devices 110 and/or communication devices of first responders, and the like, in the geographic area and/or communication devices within a threshold distance of the respective location of the sensor 106 that provided the sensor data where the target object was found, and the like. Such a notification received at a communication device may cause a user of the communication device to look for the target object. In these examples, the notification may correspond to a BOLO and/or an APB for the target object.

Returning to the block 308, in response to the sensors 106 not meeting the threshold condition (e.g., a "NO" decision at the block 308), at a block 312 the controller 218 and/or the computing device 102, provides the alert 120 to one or more of the communication devices 110 to initiate a human-based search for the target object. In these examples, the alert 120 may correspond to a BOLO and/or an APB for the target object.

In some examples, a user 112 of a communication device 110 that is to assign alerts to other users 112, and the like, to perform such a human-based search, may accept or reject the alert 120, for example based on a heuristic decision as to whether, or not, there are sufficient human-based resources to perform such a human-based search and/or whether or not the target object is important enough to merit such as human-based search (e.g., people may merit such a human-based search whereas bicycles may not).

When rejected (e.g., as determined at the computing device 102 via a rejection notification from a communication device 110), the alert 120 may be assigned to the sensor analytics engine 104 to search for the target object regardless of the sensors 106 meeting, or not meeting, a threshold condition 224. In particular, the sensor analytics engine 104 may have sufficient computing resources to perform a plurality of sensor-based searches for a plurality of target objects and hence, assigning the alert 120 to the sensor analytics engine 104 after a rejection of a human-based search may be performed at a minimum cost as compared to use of human-based resources.

Similarly, the controller 218 and/or the computing device 102, after initiating the human-based search for the target object, may receive an indication that the human-based search was unsuccessful, for example from one or more of the communication devices 110. Such an indication may, for example, be generated when the target object of the alert 120 was not found in a human-based search within a given time period, such as week, among other possibilities. As such, the alert 120 may be classified as "retired" indicating that a human-based search for the target object has stopped and/or was unsuccessful. Hence, such an indication may occur after a given time period in which the target object was not found, which may alternatively be indicated in one or more of the records 116. However, the controller 218 and/or the computing device 102 may, in response to receiving the indication that the human-based search was unsuccessful, assign the alert 120 to the sensor analytics engine 104 to search for the target object using the sensors 106, as described above.

Indeed, the controller 218 and/or the computing device 102 may assign any retired alert to the sensor analytics engine 104 to search for the target object using the sensors 106. Furthermore, the alert 120, as generated and/or retrieved at the block 302, may comprise a retired alert, which is evaluated by the controller 218 and/or the computing device 102 for assignment to the sensor analytics engine 104 and/or for revival of another human-based search due, for example, to new evidence being found in a court case and/or a new sighting of the target object in the geographic area 108, or another geographic area. In examples where the alert 120 is a retired alert, and (e.g., again) provided to one or more communication devices 110 to initiate another human-based search for the target object, the alert 120 may include reasons for again initiating another human-based search, such as an indication of new evidence being found and/or a new sighting of the target object, and the like (e.g., to prevent a user 112 from rejecting the alert 120 due to fatigue in previously searching for the target object).

In some examples, the decision, by the controller 218 and/or the computing device 102, to assign the alert 120 to the sensor analytics engine 104 (e.g. at the block 310) or initiate the human-based search (e.g. at the block 312), may be further based on one or more criteria for minimizing one or more of human resources and cost in searching for the target object and maximizing a chance of success in finding the target object. The sensors 106 meeting (or not meeting) a threshold condition 224 comprise one of such criteria.

In particular, the controller 218 and/or the computing device 102 may rely on machine learning algorithms, and the like, and/or numerical weighting schemes, and the like, to determine whether or not a given alert meets criteria for minimizing one or more of human resources and cost in searching for a target object in a given alert, and maximizing a chance of success in finding a target object. Put another way, such criteria (e.g., which may include, but is not limited to, the sensors 106 meeting (or not meeting) a threshold condition 224) may be used to determine whether to assign the alert 120 to the sensor analytics engine 104 to search for the target object using the sensors 106, and/or to provide the alert 120 to one or more of the communication devices 110 to initiate a human-based search for the target object. Put another way, while the block 308 is heretofore described with respect to the sensors 106 meeting one or more of the threshold conditions 224, other criteria (described in more detail below) may be used (e.g., at the block 308) by the controller 218 and/or the computing device 102 (e.g. implementing machine learning algorithms and/or numerical weighting schemes) to determine whether to assign the alert 120 to the sensor analytics engine 104 to search for the target object using the sensors 106 (e.g., at the block 310), and/or to provide the alert 120 to one or more of the communication devices 110 to initiate a human-based search for the target object (e.g., at the block 312).

For example, criteria for minimizing one or more of human resources and cost in searching for the target object and maximizing a chance of success in finding the target object, may include one or more of the following criteria, with each criteria assigned a score and/or weight with regards to cost and/or chance of search success and/or importance, and, in some examples, the scores and/or weights may be assigned based whether a search might be performed by the sensor analytics engine 104 or by humans:

The sensors 106 meeting (or not meeting) a threshold condition 224, which may be assigned a relatively low cost core whether, or not the sensors 106 meeting (or not meeting) a threshold condition 224. However, the sensors 106 meeting a threshold condition 224 may be assigned a relatively higher success score relative to the sensors 106 not meeting a threshold condition 224. An importance score may not be assigned to the sensors 106 meeting (or not meeting) a threshold condition 224, regardless of outcome.

A size of the geographic area 108, where the larger the geographic area, the more users needed to search it, along with a higher cost. Hence, a cost score associated with a size of the geographic area 108, associated with a human-based search, may increase or decrease with size of the geographic area 108, and a success score may decrease or increase with size of the geographic area 108 (e.g., the large the geographic area 108, the more expensive is a human-based search, and the less a chance of success). However, a cost score and a success score associated with a size of the geographic area 108, associated with a sensor-based search, may not vary with size of the geographic area 108, but rather such scores may be related to density and/or distribution of camera sensors 106 in the geographic area 108. An importance score may not be assigned to a size of a geographic area, regardless of a type of search.

A number of users available and/or needed to search the geographic area 108, with cost increasing with the number of users. Hence, a cost score associated with a number of users for a human-based search, may increase or decrease as the number increases or decreases, and a success score may increase or decrease as the number increases or decreases (e.g., the large the number of users, the more expensive is a human-based search, and the greater a chance of success). However, a cost score and a success score associated with a number of users is irrelevant to a sensor-based search.

Hence, it is understood that the cost of a human-based search will generally be higher than a sensor-based search. However, cost for performing a human-based search may be justified based on a time constraint and/or an incident type and/or an incident priority, as described hereafter.

A time constraint for searching for target object; for example, alerts to search for humans, such as amber alerts, may be time sensitive and searches for missing humans may be most effective within a first twenty-four hours after the human goes missing and may justify cost a human-based search. In contrast, searches for vehicles may not be so time sensitive and may not justify cost for a human-based search. Hence, a chance of success for a human-based search, for a human, performed with a given time constraint may be assigned a relatively high success score, with an associated higher importance score, and an associated higher cost score, while a chance of success for a sensor-based search, for a human, performed with the given time constraint may be assigned a similar success score and/or a lower success score, with an associated lower cost score, but a same importance score, with the success score depending on previous sensor-based searches for humans in the geographic area 108.

Incident type and/or incident priority associated with an alert. For example, some incident types, such as a search for a murder suspect, may be more urgent and/or may be of a higher priority than other incident types, such as a search for a stolen bicycle. Hence, an incident type and/or an incident priority may be used to justify, or not, cost for a human-based search. Hence, a human-based search for a murder suspect may be assigned an importance score indicating a relatively high importance, and with an associated higher cost score, while a human-based search for a stolen bicycle may be assigned an importance score indicating a relatively low importance, with an associated higher cost score. Similarly, a sensor-based search for a murder suspect may be assigned an importance score indicating a relatively high importance, with an associated lower cost score, while a sensor-based search for a stolen bicycle may be assigned an importance score indicating a relatively low importance, with an associated lower cost score. Success scores may, or may not, be assigned to an incident type and/or an incident priority, and may depend on historical data, as described above.

Such criteria for a given alert may hence be assigned respective scores, as described, for example for costs of human-based searches and/or chances of success and/or importance, and the scores may be weighted using any suitable scheme. For example, importance scores may be assigned a highest weight (e.g., in a range of 40 to 80%, such as 60%), a success score may be assigned a lower weight (e.g., in a range of 10 to 40%, such as 30%) than the importance score, and a cost score may be assigned a lowest weight (e.g., in a range of 5 to 20%, such as 10%).

However, any suitable criteria may be used to minimize human resources and/or cost in searching for a target object and maximizing a chance of success in finding the target object including, but not limited to: data from the records 116, which may indicate an age of mentions of the target object therein, with older mentions leading to a lowered success score and hence a lowered justification of a human-based search; numbers of links, associated with the target object, in the records 116, with a relatively larger number of links leading to a higher success score and hence a higher justification of a human-based search; numbers of appearances of the target object in the geographic area 108 with a relatively larger number of appearances leading to a higher success score and hence a higher justification of a human-based search.

However, any suitable criteria may be used to determine whether a human-based search or a sensor-based search is selected for a given alert.

Indeed, in some examples, the process 300 may further comprise the controller 218 and/or the computing device 102, based on one or more such criteria for minimizing one or more of human resources and cost in searching for the target object and maximizing a chance of success in finding the target object, initiating a human-based search for the target object for one or more of: the geographic area 108; a further geographic area larger than the geographic area 108; a limited time period; and a further time period larger than the limited time period.

For example, the criteria described above may be used to determine that a human-based search is to occur only in the geographic area 108, for example, to increase a chance of success in finding the target object, while still minimizing cost to limit the human-based search to users in the geographic area 108. However, the criteria described above may be used to determine that a human-based search is to occur in the geographic area 108 and other geographic areas (e.g., a further geographic area larger than the geographic area 108), for example, to increase a chance of success in finding the target object, with cost of the human-based search being increased. For example, whether or not a human-based search is performed only in the geographic area 108 or in the geographic area 108 and other geographic areas, may depend on an importance score associated with an alert and/or an associated incident type and/or an associated incident priority, and the like, with a higher importance score and/or an higher incident priority leading to a wider geographic human-based search.

Similarly, the criteria described above may be used to determine that a human-based search is to occur for only a limited time period (e.g., for twenty-four hours), for example, to increase a chance of success in finding the target object, while still minimizing cost to limit the human-based search. However, the criteria described above may be used to determine that a human-based search is to occur for a longer time period (e.g., one week). For example, whether or not a human-based search is performed for a shorter time period or a longer time period, may depend on an importance score associated with an alert and/or an associated incident type and/or an associated incident priority, and the like with a higher importance score and/or an higher incident priority leading to a longer human-based search.

Figure 4:
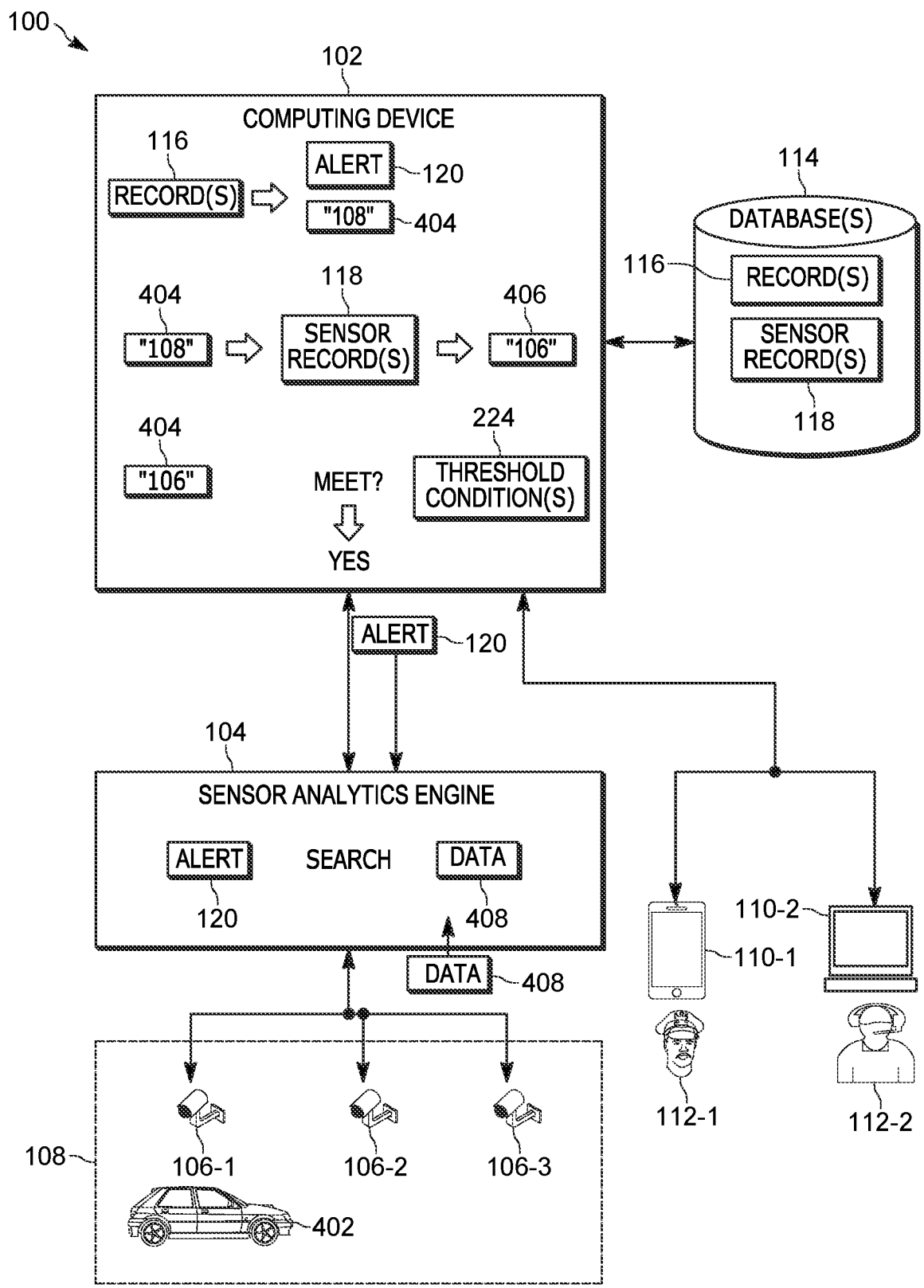
FIG. 4 depicts the system of FIG. 1 implementing a process for assigning alerts to sensor analytics engines, in accordance with some examples.
Figure 5:
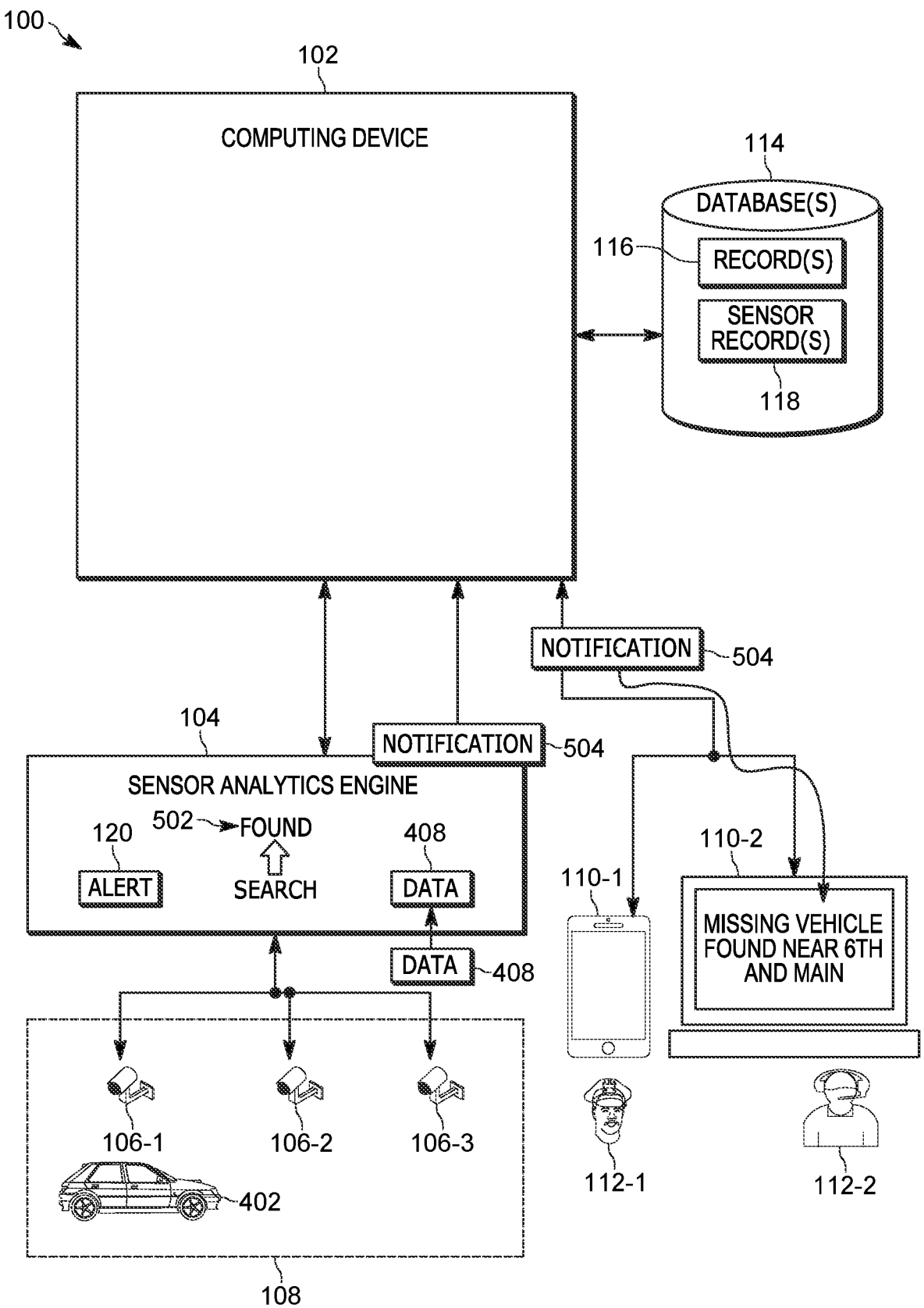
FIG. 5 depicts the system of FIG. 1 continuing to implement a process for assigning alerts to sensor analytics engines, in accordance with some examples.

Attention is next directed to FIG. 4 and FIG. 5, which depicts an example of the process 300. FIG. 4 and FIG. 5 are similar to FIG. 1 with like components having like numbers.

Attention is first directed to FIG. 4, which depicts the computing device 102 generating (e.g., at the block 302 of the process 300) the alert 120 from the records 116, as previously described. FIG. 4 depicts the computing device 102 determining (e.g., at the block 304 of the process 300) the associated geographic area 108 from the records 116, for example as an indication 404 of the geographic area 108 (e.g., as depicted text "108"). As depicted, the alert 120 is understood to be for a vehicle 402, which, as depicted, is located in the geographic area 108; for example, the vehicle 402 may have been determined to have been stolen a year ago (e.g., and a previous alert therefor may have been retired), but was recently sighted in the geographic area 108, as indicated by the records 116.

As also depicted in FIG. 4, the computing device 102 may use the indication 404 of the geographic area 108 to search the sensor records 118 to determine (e.g., at the block 306 of the process 300), which of the sensors 106 are located in the geographic area 108. A subset 406 (e.g., labelled "106" for the sensors 106) of the sensor records 118 may comprise records for the sensors 106 and the subset 406 may indicated addresses and types of the sensors 106 located in the geographic area 108, which may enable the computing device 102 to determine respective densities and/or distributions of different types of the sensors 106 in the geographic area 108. The subset 406 is used to determine (e.g., at the block 308 of the process 300) whether or not the sensors 106 meet one or more of the threshold conditions 224 as has previously been described.

As depicted, in FIG. 4, the computing device 102 determine that the sensors 106 meet one or more of the threshold conditions 224 (e.g., a "YES" decision at the block 308 of the process 300) and the alert 120 is provided (e.g., at the block 310 of the process 300) to the sensor analytics engine 104. As depicted, the sensor analytics engine 104 may search sensor data 408 from the sensors 106 using information received in the alert 120; for example such information may include a classifier corresponding to the vehicle 402, such as a make, model, color, and/or license plate number of the vehicle 402 used to perform an image search for the vehicle 402 in the sensor data 408.

With attention directed to FIG. 5, when the sensor analytics engine 104 finds the vehicle 402 in the sensor data 408 (e.g., as indicated by an indication 502 of "Found"), the sensor analytics engine 104 may transmit a notification 504 thereof to the computing device 102, which may relay the notification 504 to the communication device 110-2 (and/or another communication device 110), which provides information in the notification 504 on a display screen thereof, for example to cause the user 112-2 to deploy other users 112 in the geographic area 108 to a location of the sensor 106.

While not depicted, when the computing device 102 determines that the sensors 106 do not meet one or more of the threshold conditions 224 (e.g., a "NO" decision at the block 308 of the process 300) the alert 120 is provided (e.g., at the block 312 of the process 300) to one or more communication devices 110. In some of these examples, the alert 120 may also be provided to the sensor analytics engine 104 to search for the target object using the sensors 106.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot implement a sensor analytics engine, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   one or more of generating and receiving, at a computing device, an alert to perform a search for a target object;
   determining, at the computing device, a geographic area in which to perform the search for the target object;
   determining, at the computing device, sensors available in the geographic area for use in the search for the target object;
   in response to the sensors meeting a threshold condition, assigning the alert to a sensor analytics engine to search for the target object using the sensors, the threshold condition based on a density of the sensors in the geographic area; and
   in response to the sensors not meeting the threshold condition, providing the alert to one or more communication devices to initiate a human-based search for the target object.

2. The method of claim 1, wherein the threshold condition is further based on one or more of:
   numbers of the sensors in the geographic area;
   distribution of the sensors in the geographic area;
   coverage of the sensors in the geographic area;
   locations of the sensors in the geographic area;
   types of scenes imaged by cameras of the sensors in the geographic area; and
   types of the sensors available in the geographic area.

3. The method of claim 1, wherein the sensors comprise one or more of cameras and microphones, and the sensor analytics engine comprises one or more of a video analytics engine and an audio analytics engine.

4. The method of claim 1, further comprising, in response to the sensors meeting the threshold condition, generating at least one classifier for use by the sensor analytics engine to search for the target object using one or more algorithms, at the sensor analytics engine, to search for the target object using sensor data from the sensors as input to the one or more algorithms.

5. The method of claim 1, further comprising:
after initiating the human-based search for the target object, receiving an indication that the human-based search was unsuccessful; and
in response to receiving the indication that the human-based search was unsuccessful, assigning the alert to the sensor analytics engine to search for the target object using the sensors.

6. The method of claim 1, further comprising, based on one or more criteria for minimizing one or more of human resources and cost in searching for the target object and maximizing a chance of success in finding the target object, initiating the human-based search for the target object for one or more of:
the geographic area;
a further geographic area larger than the geographic area;
a limited time period; and
a further time period larger than the limited time period.

7. The method of claim 1, wherein a decision to assigning the alert to the sensor analytics engine or initiating the human-based search is further based on one or more criteria for minimizing one or more of human resources and cost in searching for the target object and maximizing a chance of success in finding the target object.

8. The method of claim 1, wherein the threshold condition comprises the density of the sensors in the geographic area being above a threshold density.

9. The method of claim 1, wherein the threshold condition comprises the density of the sensors in the geographic area being above a threshold density associated with one or more of given locations and given scene types.

10. The method of claim 1, wherein the threshold condition comprises:
when the target object is of a first object type, the density of the sensors in the geographic area being above a first threshold density associated with the first object type; and
when the target object is of a second object type different from the first object type, the density of the sensors in the geographic area being above a second threshold density different from the first threshold density.

11. A device comprising:
a communication unit; and
a controller communicatively coupled to the communication unit, the controller configured to:
one or more of generate, and receive via the communication unit, an alert to perform a search for a target object;
determine a geographic area in which to perform the search for the target object;
determine sensors available in the geographic area for use in the search for the target object;
in response to the sensors meeting a threshold condition, assign the alert to a sensor analytics engine to search for the target object using the sensors, the threshold condition based a density of the sensors in the geographic area; and
in response to the sensors not meeting the threshold condition, provide, via the communication unit, the alert to one or more communication devices to initiate a human-based search for the target object.

12. The device of claim 11, wherein the threshold condition is further based on one or more of:
numbers of the sensors in the geographic area;
distribution of the sensors in the geographic area;
coverage of the sensors in the geographic area;
locations of the sensors in the geographic area;
types of scenes imaged by cameras of the sensors in the geographic area; and
types of the sensors available in the geographic area.

13. The device of claim 11, wherein the sensors comprise one or more of cameras and microphones, and the sensor analytics engine comprises one or more of a video analytics engine and an audio analytics engine.

14. The device of claim 11, wherein the controller is further configured to: in response to the sensors meeting the threshold condition, generate at least one classifier for use by the sensor analytics engine to search for the target object using one or more algorithms, at the sensor analytics engine, to search for the target object using sensor data from the sensors as input to the one or more algorithms.

15. The device of claim 11, wherein the controller is further configured to:
after initiating the human-based search for the target object, receive, via the communication unit, an indication that the human-based search was unsuccessful; and
in response to receiving the indication that the human-based search was unsuccessful, assign the alert to the sensor analytics engine to search for the target object using the sensors.

16. The device of claim 11, wherein the controller is further configured to, based on one or more criteria for minimizing one or more of human resources and cost in searching for the target object and maximizing a chance of success in finding the target object, initiate the human-based search for the target object for one or more of:
the geographic area;
a further geographic area larger than the geographic area;
a limited time period; and
a further time period larger than the limited time period.

17. The device of claim 11, wherein the controller is further configured to decide whether to assign the alert to the sensor analytics engine or initiate the human-based search further based on one or more criteria for minimizing one or more of human resources and cost in searching for the target object and maximizing a chance of success in finding the target object.

18. The device of claim 11, wherein the threshold condition comprises the density of the sensors in the geographic area being above a threshold density.

19. The device of claim 11, wherein the threshold condition comprises the density of the sensors in the geographic area being above a threshold density associated with one or more of given locations and given scene types.

20. The device of claim 11, wherein the threshold condition comprises:
when the target object is of a first object type, the density of the sensors in the geographic area being above a first threshold density associated with the first object type; and
when the target object is of a second object type different from the first object type, the density of the sensors in the geographic area being above a second threshold density different from the first threshold density.

\* \* \* \* \*